United States Patent
Macri et al.

(10) Patent No.: US 7,509,515 B2
(45) Date of Patent: Mar. 24, 2009

(54) METHOD AND SYSTEM FOR COMMUNICATED CLIENT PHASE INFORMATION DURING AN IDLE PERIOD OF A DATA BUS

(75) Inventors: Joseph Macri, Markham (CA); Steven Morein, Markham (CA); Claude Gauthier, Markham (CA); Ming-Ju E. Lee, Markham (CA); Lin Chen, Markham (CA)

(73) Assignee: ATI Technologies, Inc., Markham (CA)

( * ) Notice: Subject to any disclaimer, the term of this patent is extended or adjusted under 35 U.S.C. 154(b) by 432 days.

(21) Appl. No.: 11/231,193

(22) Filed: Sep. 19, 2005

(65) Prior Publication Data

US 2007/0067661 A1 Mar. 22, 2007

(51) Int. Cl.
*G06F 1/00* (2006.01)
(52) U.S. Cl. .................... 713/500; 713/501; 711/100
(58) Field of Classification Search ............... 713/500, 713/503; 711/100
See application file for complete search history.

(56) References Cited

U.S. PATENT DOCUMENTS

| | | | | |
|---|---|---|---|---|
| 4,368,987 A | * | 1/1983 | Waters | 368/46 |
| 4,694,472 A | * | 9/1987 | Torok et al. | 375/354 |
| 5,432,823 A | * | 7/1995 | Gasbarro et al. | 375/356 |
| 6,128,318 A | * | 10/2000 | Sato | 370/503 |
| 6,236,623 B1 | * | 5/2001 | Read et al. | 368/46 |
| 6,304,119 B1 | * | 10/2001 | Tseng et al. | 327/161 |
| 6,434,081 B1 | * | 8/2002 | Johnson et al. | 365/233.14 |
| 6,606,041 B1 | * | 8/2003 | Johnson et al. | 341/120 |
| 6,807,638 B1 | * | 10/2004 | Moyal et al. | 713/400 |
| 6,845,460 B2 | * | 1/2005 | Lee et al. | 713/401 |
| 7,064,590 B2 | * | 6/2006 | Hohnel | 327/141 |
| 7,095,789 B2 | * | 8/2006 | Ware et al. | 375/257 |
| 7,111,184 B2 | * | 9/2006 | Thomas et al. | 713/401 |
| 7,231,306 B1 | * | 6/2007 | Rajan et al. | 702/89 |
| 7,334,148 B2 | * | 2/2008 | Liu et al. | 713/401 |
| 2002/0138224 A1 | * | 9/2002 | Sessions | 702/107 |
| 2003/0018824 A1 | * | 1/2003 | Ponticelli | 709/253 |
| 2004/0049708 A1 | * | 3/2004 | Thomas et al. | 713/500 |
| 2004/0076192 A1 | * | 4/2004 | Zerbe et al. | 370/516 |
| 2004/0098634 A1 | * | 5/2004 | Zerbe et al. | 713/500 |
| 2005/0204245 A1 | * | 9/2005 | Lee et al. | 714/744 |
| 2006/0222126 A1 | * | 10/2006 | Edwards et al. | 375/354 |
| 2006/0245454 A1 | * | 11/2006 | Balasubramanian et al. | 370/509 |

FOREIGN PATENT DOCUMENTS

| | | |
|---|---|---|
| EP | 0 929 155 A2 | 11/1998 |
| EP | 1 315 328 A2 | 9/2002 |
| EP | 1 652 731 A1 | 6/2004 |

* cited by examiner

*Primary Examiner*—Thomas Lee
*Assistant Examiner*—Jaweed A Abbaszadeh
(74) *Attorney, Agent, or Firm*—Courtney Staniford & Gregory LLP

(57) ABSTRACT

A system and method for transmitting client phase information to a host device over a bidirectional data link is described. Embodiments include detecting a phase of a clock signal relative to a data signal transmitted between a host device and a client device over a bidirectional data link. The data link includes one or more data lines each configured to transmit a corresponding bit of the data signal. The phase is encoded as client phase information and transmitted between the host and client device over the one or more data lines. The client phase information is transmitted during an electrical turn-around time period of the bidirectional data link between a read and write operation over the data link.

17 Claims, 6 Drawing Sheets

METHOD AND SYSTEM FOR COMMUNICATED CLIENT PHASE INFORMATION DURING AN IDLE PERIOD OF A DATA BUS

TECHNICAL FIELD

The invention is in the field of data transfer in computer and other digital systems.

BACKGROUND

As computer and other digital systems become more complex and more capable, methods and hardware to enhance the transfer of data between system components or elements continually evolve. Data to be transferred include signals representing data, commands, or any other signals. System components or elements can include different functional hardware blocks on a single integrated circuit (IC), or on different ICs. The different ICs may or may not be on the same printed circuit board (PCB). System components typically include an input/output (IO) interface, or physical layer, specifically designed to receive data from other system components and to transmit data to other system components.

In many systems, some components are characterized as hosts and other components are characterized as clients. Host components generally include more capability or "intelligence" implemented, for example, as integrated circuit logic. An example of a host-client relationship is a memory controller (host)-memory device (client) relationship. It is often desirable for a client device, such as a dynamic random access memory (DRAM) for example, to include only a minimum amount of intelligence for functions such as managing IO. One reason for this is that it is expensive in terms of area and speed to implement logic on a DRAM device. Therefore, it is desirable for the host device to include as much intelligence as possible for managing IO interactions with a client such as a DRAM.

Existing IO interfaces and methods include "symmetrical 10" and "asymmetrical IO". In general, for symmetrical IO, a host and a client each include similar IO capability, typically in the form of physical layer circuitry devoted to IO functions. Symmetrical IO can be expensive for the reasons explained above. For example, including all of the required physical layer IO logic in a DRAM is expensive.

In general, for asymmetrical IO, a host and a client do not have similar IO capability. The host typically includes at least some circuitry to manage IO on behalf of the client so that the client can be a simpler device. However, typical current asymmetrical physical layer IO designs place excessive burden on host side, for example by including circuitry for handling client functions.

Regardless of the type of IO interface, transferred data must be synchronized between host and client for proper operation. Synchronization includes accounting for or compensating for several phenomena that potentially cause errors, including signal jitter and bit skew. The phenomena include differences between component clocks, and physical attributes of the data paths that create noise and affect the integrity of the transferred signal. Current asymmetrical IO designs can have circuitry in the host device for performing this synchronization on behalf of both the host and client. Some of the circuitry is redundant. For example, the redundant circuitry includes phase interpolators for each of the host and client that adjust the phase of a sampling clock or a data signal in response to phase detection information. An object of this phase adjustment is to maintain the active edge, or sampling edge, of the sampling clock close to the center of the data eye of the data to be sampled in order to prevent errors. Client-side phase information is transferred from the client to the host, and used by the host-side synchronization circuitry to perform phase adjustment for the client device.

Another disadvantage of current asymmetrical IO systems is that client-side phase information is inefficiently transferred from the client device to the host device. For example, in some systems, dedicated pins are added to carry phase information for each data bit, which adds expense and undesirably increases form factors of components in the system.

FIG. 1 is a block diagram of portions of a prior art asymmetrical IO system 100, including a physical layer of a host device 102 and a physical layer of a client device 104. The host device 102 and the client device 104 each receive a system timing signal in a respective phase lock loop (PLL) (host PLL 116 or client PLL 106) to generate one or more local clock signals, including a sampling clock for sampling incoming data. The client device 104 receives data on multiple bidirectional data lines 112 and includes client phase detection circuitry 110 that determines whether the sampling clock is aligned close to the center of the data eye of the received data. The client phase detection circuitry outputs phase information that is transmitted to the host device 102 through physical signal carrier 114, which could be dedicated data lines.

The host device 102 includes host phase detection circuitry 118 that determines whether the local sampling clock is properly aligned with respect to data received by the host device 102 on multiple bidirectional data lines 112. The host device 102 also includes redundant circuitry for adjusting the phase of its local sampling clock, and for adjusting the phase of the data transmitted to the client device 104 in response to the client phase information transmitted on lines 114. In various prior systems, lines 114 represent dedicated, additional wires, circuit board traces, pins, etc. for each data bit transmitted on lines 112. For adjusting the phase of the host device local sampling clock, the host device 102 includes receive phase control logic 120, receive phase interpolator 122 and latch/flop 128. To adjust the phase of the data transmitted to the client device 104, the host device 102 includes transmit phase control logic 126, transmit phase interpolator 124, transmit phase control logic 126, and latch/flop 130.

DETAILED DESCRIPTION

Embodiments of an asymmetrical IO method and system are described herein. In one embodiment, a host device includes shared resources for data synchronization of the host device and a client device. The shared resources include a shared phase interpolator. In an embodiment, multiple bidirectional data lines are also used to transmit phase information from the client device to the host device, obviating the need for additional, dedicated lines or pins. As used herein, the term "lines" encompasses wires, traces on a circuit board, integrated circuit component pins, or any other signal carrying media. The multiple bidirectional data lines, which are also used to transmit clock phase information, are also referred to herein as a data link. Embodiments described herein are appropriate to systems in which a memory controller is a host device and a high speed memory device (such as a double data rate dynamic random access memory (DDR DRAM)) is a client device. However, embodiments are not limited to such systems.

Figure 1:
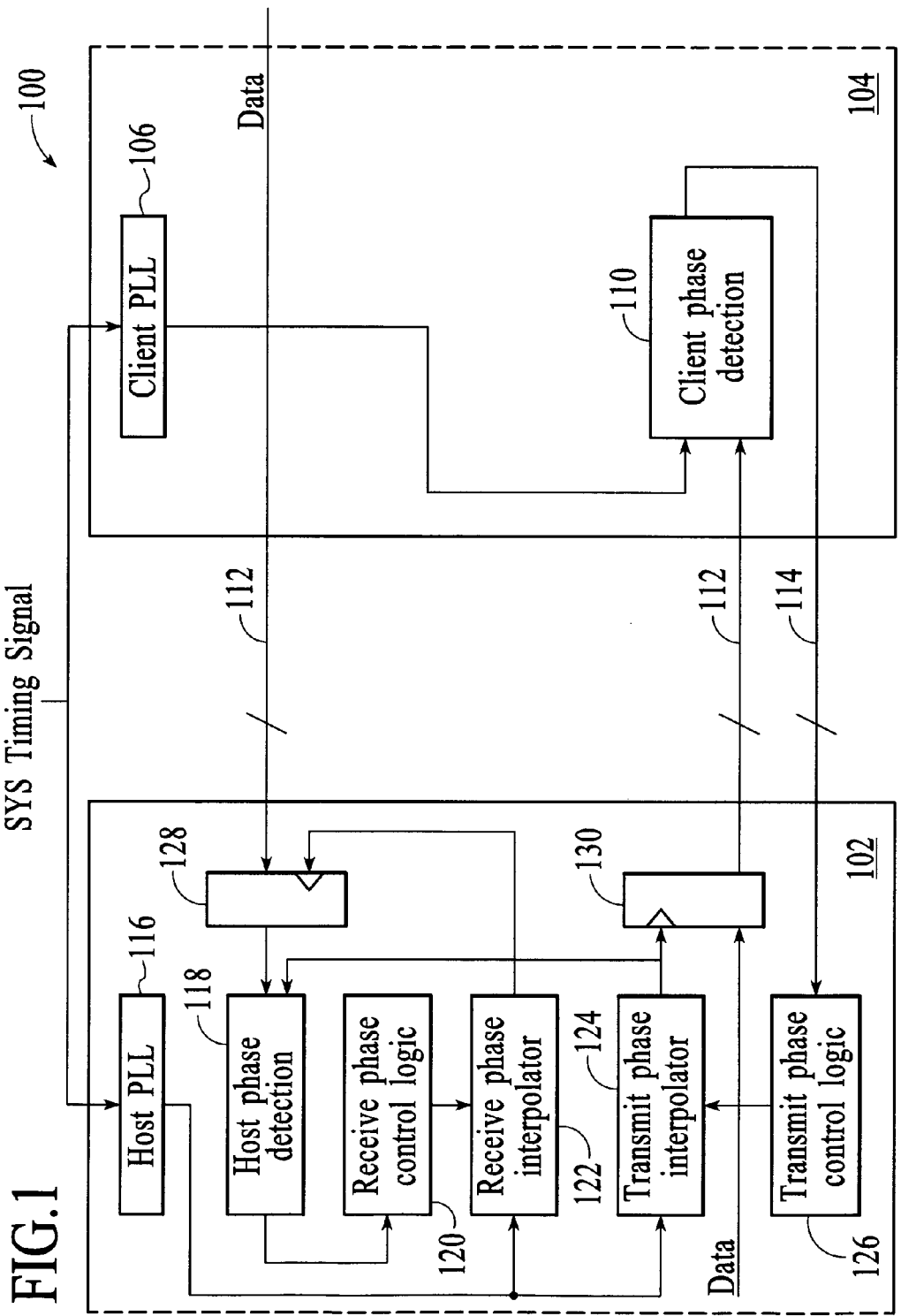
FIG. 1 is a block diagram of portions of a prior art asymmetrical IO system.
Figure 2:
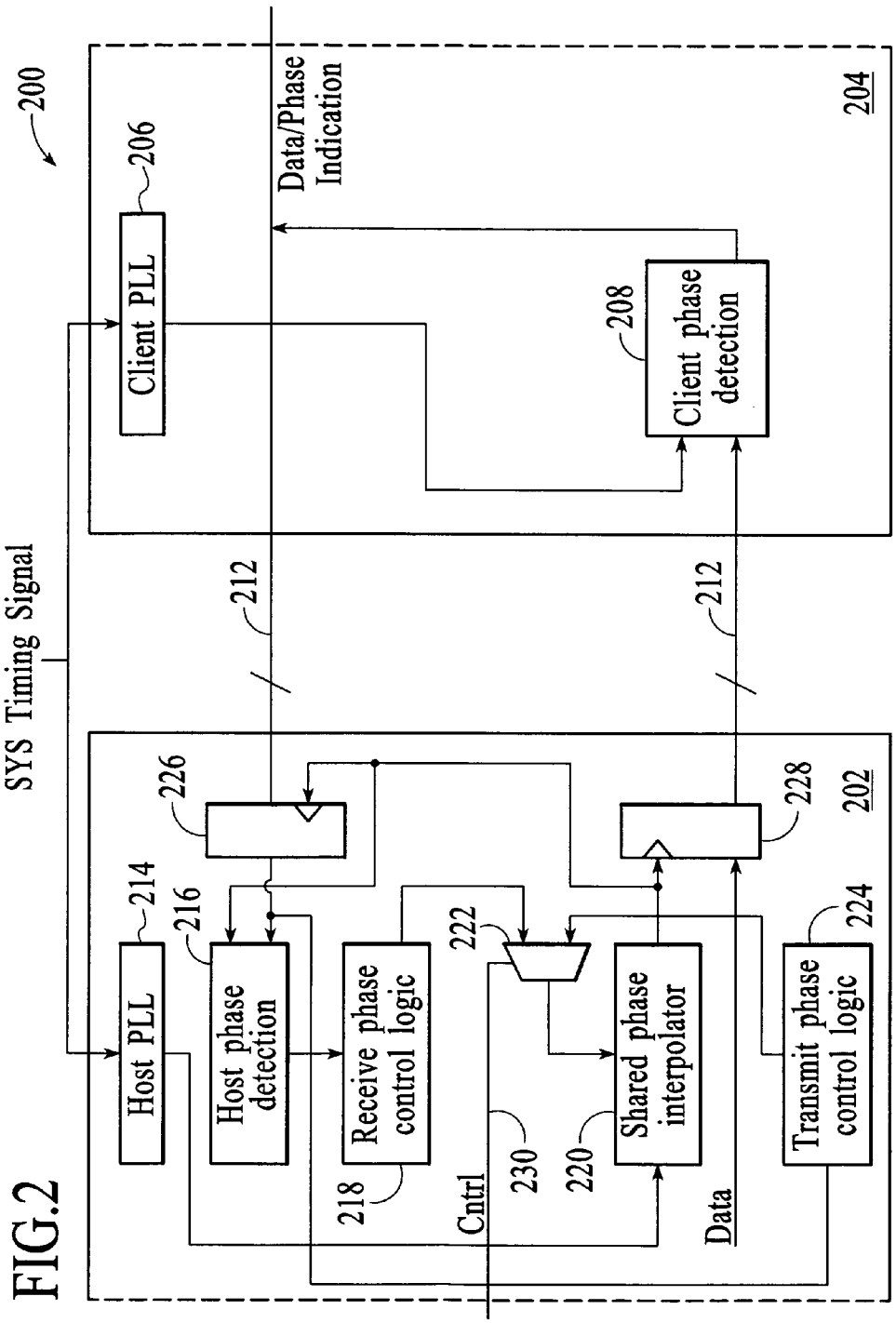
FIG. 2 is a block diagram of portions of an asymmetrical IO system, according to an embodiment.

FIG. 2 is a block diagram of portions of an asymmetrical IO system 200 according to an embodiment. The system 200 includes a host device 202 and a client device 204. Various elements of a physical layer, including data synchronization elements, are shown for each of host device 202 and client device 204. A system timing signal is received by a host PLL 214 and also by a client PLL 206. The host PLL 214 generates a local host clock signal that is used, for example, for sampling data received by the host device by clocking latch/flop 226, which in an embodiment is a known flip-flop. The local host clock signal is also used to control transmitting data from the host device by clocking latch/flop 228.

The client PLL 206 generates a local client clock signal that is used to sample data transmitted by the host device 202 on data link 212. A client phase detection circuit 208 receives the data on data link 212 and the local client clock signal, and detects the phase relationship between the active (sampling) edge of the local client clock signal and the data eye of the data stream transmitted on data link 212 from the host 202. The client phase detection circuit 208 outputs client phase information that is transmitted to transmit phase control logic 224 (on the host device 202) during periods when the data link 212 are not being used to transmit data between the host device 202 and the client device 204. Transmission of the client phase information will be explained in more detail below.

The client phase information signal in an embodiment is a certain number of bits encoded to indicate that the local client clock is early, late, or aligned (also referred to as no operation, or NOP) with respect to the data eye of the data received by the client device 204. The local client clock signal is considered aligned if the active edge of the local client clock signal is close to the center of the data eye of the received data stream on data link 212. In an embodiment, the client phase information signal includes two bits encoded to indicate the phase relationship of the local clock with the received data eye. Other embodiments can include more bits (e.g., three bits) to indicate the client phase information with finer granularity, for example the local clock is very late, late, early, very early, etc., with respect to the received data.

The transmit phase control logic 224 outputs a transmit phase control signal that controls a shared phase interpolator 220 to adjust the local host clock with respect to data transmitted to the client. Phase interpolators are known devices that adjust the phase of a clock signal or other signal, for example by delaying the signal for a configurable number of stages. In various embodiments, any signal timing adjustment device or method is appropriate as an alternative to a typical phase interpolator.

The host device 202 further includes a host phase detection circuit 216 that receives the output of the shared phase interpolator 220 and data from the client 206 on data link 212. The output of the shared interpolator 220, in an embodiment, is an adjusted local host clock signal. The host phase detection circuit 216 determines the phase of the adjusted local host clock signal with respect to the data received and outputs a host phase information signal. The host phase information signal is received by receive phase control logic 218, which outputs a receive phase control signal. The host phase information signal in an embodiment is two bits encoded to indicate that the adjusted local host clock signal is early, late, or aligned with respect to the data eye. The adjusted local host clock signal is considered aligned with received data if the active edge of the adjusted local host clock signal is close to the center of the data eye of the received data stream on data link 212. Other embodiments can include more bits (e.g., three bits) to indicate the host phase information with finer granularity, for example the local host clock is very late, late, early, very early, etc., with respect to the received data.

The output of the receive phase control logic 218 (the receive phase control signal) and the output of the transmit phase control logic 224 (the transmit phase control signal) are both inputs to multiplexer 222. The output of the multiplexer 222 is received by a shared phase interpolator 220. One of the inputs of the multiplexer 222 is selected to be output from the multiplexer 222 in a known manner. The multiplexer 222 outputs one of the phase control signals according to a control signal on a select line 230. In one embodiment the control signal is an output or transmit enable (OE) signal that indicates the direction of data transmission on the data link 212. In an embodiment, a high OE signal indicates that the host device 202 is transmitting data on the bidirectional data link 212. In such an embodiment, when the control signal is high, the transmit phase control signal is output by the multiplexer 222 to the shared phase interpolator 220. In other embodiments, a low OE signal indicates that the host device 202 is transmitting data on the data link 212. In other embodiment other signals are used to control the output of the multiplexer 222, including signals generated by intermediate logic (not shown) from any combination of signals. Alternatively the select line 230 can be controlled by software at any level.

When the transmit phase control signal is the input to the shared phase interpolator 220, the adjusted local host clock signal is output to the latch/flop 228 to control transmission of data to the client device 204. In effect, when the transmit phase control signal is the input to the shared phase interpolator 220, the data transmitted by the host 202 to the client 204 is moved forward or backward according to the transmit phase control signal.

When the receive phase control signal is the input to the shared phase interpolator 222, the phase adjusted local host clock signal is output to the latch/flop 226 to control sampling of data received by the host device 202. In effect, when the receive phase control signal is the input to the shared phase interpolator 222, the local host clock is moved forward or backward according to the receive phase control signal.

Figure 3:
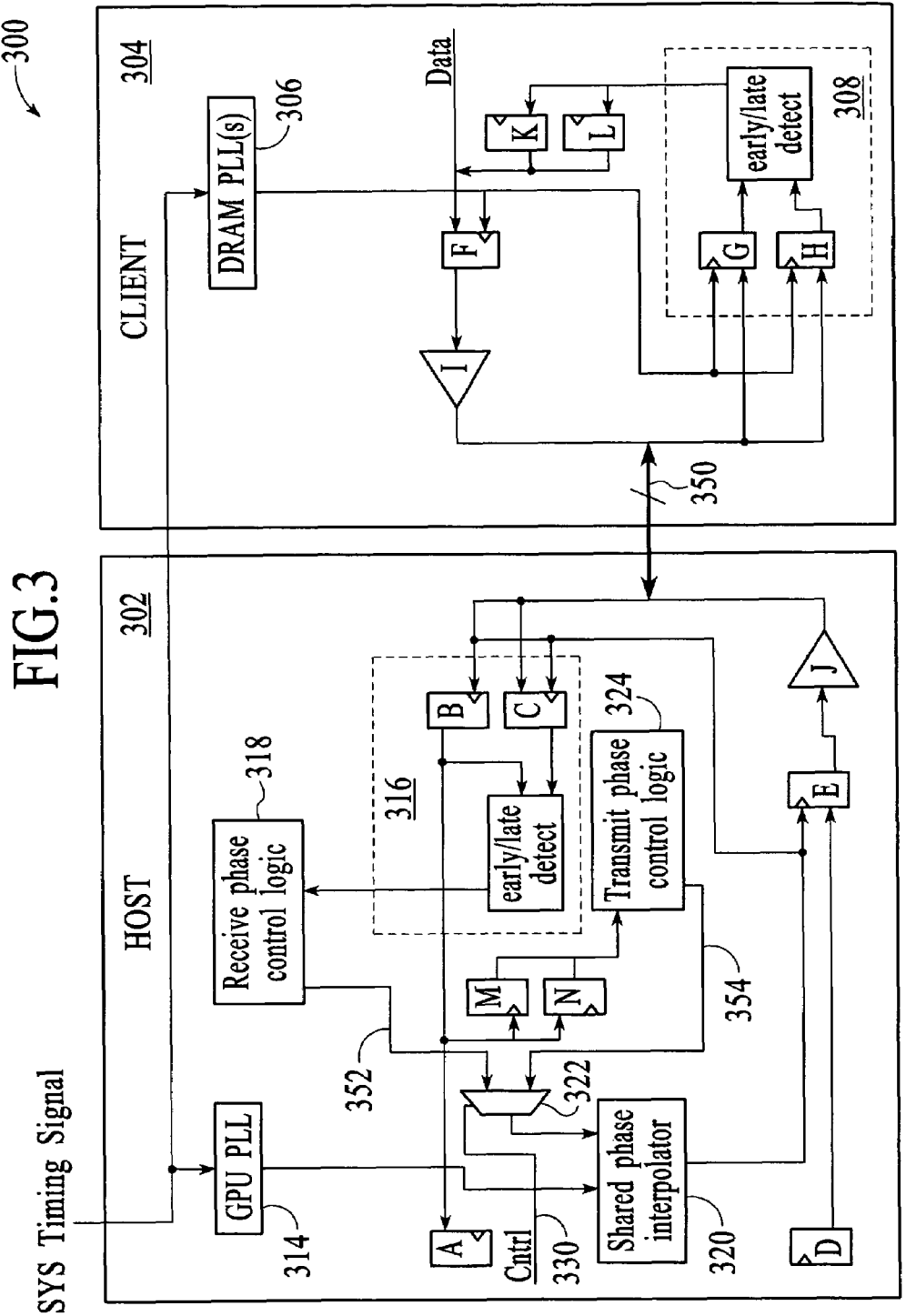
FIG. 3 is a more detailed block diagram of an asymmetrical IO system, according to an embodiment.

FIG. 3 is a more detailed block diagram of portions of an asymmetrical IO system 300 according to an embodiment. The system 300 includes a host device 302 and a client device 304. The host device 302 and the client device 304 communicate through a bidirectional data link 350 which includes a data bus and command/address lines. In an embodiment, the data bus includes a separate data bit line for each data bit. Each of the data bit lines also carries clock phase information for a corresponding bit, as further described below. Various elements of a physical layer, including data synchronization elements, are shown for each of host device 302 and client device 304. A system timing signal is received by a host PLL 314 and also by a client PLL 306. The host PLL 314 generates a local host clock signal that is adjusted by a shared phase interpolator 320 to generate an adjusted local host clock signal. The adjusted local host clock signal is used, for example, for sampling data received by the host device by clocking latches/flops B and C. The adjusted local host clock signal is also used to control transmitting data from the host device through buffer J by clocking latch/flop E.

The client PLL 306 generates a local client clock signal that is used to sample data transmitted by the host device 302 on bidirectional data link 350. A client phase detection circuit 308 receives the data on data link 350 and the local client clock signal, and detects the phase relationship between the active (sampling) edge of the local client clock signal and the data eye of the data stream transmitted on data link 350 from the host 302. The client phase detection circuit 308 includes latches/flops G and H and early/late detection circuitry.

The client phase detection circuit 308 outputs a client phase information signal to latches/flops K and L. The client phase information is transmitted to transmit phase control logic 324 (on the host device 302) during periods when the data link 350 is not being used to transmit data between the host device 302 and the client device 304. Transmission of the client phase information will be explained in more detail below. Latch/flop F is clocked by the local client clock to transmit signals through buffer I to data link 350 and client phase detection circuit 308.

The host device 302 further includes input/output latches/flops A and D and a host phase detection circuit 316 that receives the adjusted local host clock signal, and data and control signals from the client 304 on data link 350 through latches/flops B and C. The host phase detection circuit 316 determines the phase of the adjusted local host clock signal with respect to the data received and outputs a host phase information signal. The host phase information signal is received by receive phase control logic 318, which outputs a receive phase control signal. The host phase information signal in an embodiment is a certain number (e.g., two or three) bits encoded to indicate that the local host clock signal is early, late, or aligned with respect to the data eye. The adjusted local host clock signal is considered aligned if the active edge of the adjusted local host clock signal is close to the center of the data eye of the received data stream on data link 350. Other embodiments can include more bits (e.g., three bits) to indicate the host phase information with finer granularity, for example the local host clock is very late, late, early, very early, etc., with respect to the received data.

The transmit phase control logic 324 receives the client phase information signal through latches/flops M and N. The transmit phase control logic 324 on the host device 302 outputs a transmit phase control signal. The client phase information signal in an embodiment is a certain number (e.g., two or three) bits encoded to indicate that the local client clock is early, late, or aligned with respect to the data eye of the data received by the client device 304. The local client clock signal is considered aligned if the active edge of the local client clock signal is close to the center of the data eye of the received data stream on data link 350.

The output of the receive phase control logic (the receive phase control signal) and the output of the transmit phase control logic (the transmit phase control signal) are both inputs to multiplexer 322. In one embodiment, the multiplexer 322 is a control device that determines which phase control signal (transmit or receive) is used to adjust the local host clock. In other embodiments, other control devices or methods could be used. The output of the multiplexer 322 is received by a shared phase interpolator 320. One of the inputs of the multiplexer 322 is selected to be output from the multiplexer 322 in a known manner. The multiplexer 322 outputs one of the phase control signals according to a control signal on a select line 330. In one embodiment the control signal is an output or transmit enable (OE) signal that indicates the direction of data transmission on the data link 350. In an embodiment, a high OE signal indicates that the host device 302 is transmitting data on the bidirectional data link 350. In such an embodiment, when the control signal is high, the transmit phase control signal is output by the multiplexer 322 to the shared phase interpolator 320. In other embodiments, a low OE signal indicates that the host device 302 is transmitting data on the bidirectional data link 350. In other embodiment other signals are used to control the output of the multiplexer 322, including signals generated by intermediate logic (not shown) from any combination of signals. Alternatively, the select line 330 can be controlled by software at any level. The shared phase interpolator 320 receives one of the phase control signals and the local host clock signal and outputs the adjusted local host clock signal.

When the receive phase control signal is the input to the shared phase interpolator 320, the adjusted local host clock signal is output to the latches/flops B and C to control sampling of data received by the host device 302. In effect, when the receive phase control signal is the input to the shared phase interpolator 320, the local host clock is moved forward or backward relative to the received data, according to the receive phase control signal.

When the transmit phase control signal is the input to the shared phase interpolator 320, the adjusted local host clock signal is output to the latch E to control transmission of data to the client device 304. In effect, when the transmit phase control signal is the input to the shared phase interpolator 320, the data transmitted by the host 302 to the client 304 is moved forward or backward relative to the local client clock signal according to the transmit phase control signal.

In various embodiments, the synchronization elements in the host 302 and the client 304 (including host phase detection circuit 316, client phase detection circuit 308, receive phase control logic 318 and transmit phase control logic 324) do not operate at all times. In various embodiments, the control of the described circuitry is performed by a high-level system protocol. For example, the protocol can dictate that the phase detection and adjustment occur at certain intervals. Alternatively, the interval at which the phase detection and adjustment occurs can be adapted based on historical information. For example, if no adjustment was required on the last two phase detection periods, the interval is increased. The phase detection and adjustment can be enabled and disabled in various ways under various conditions. Many other behaviors can be dictated by the protocol governing the physical layers of the host and client.

Figure 4:
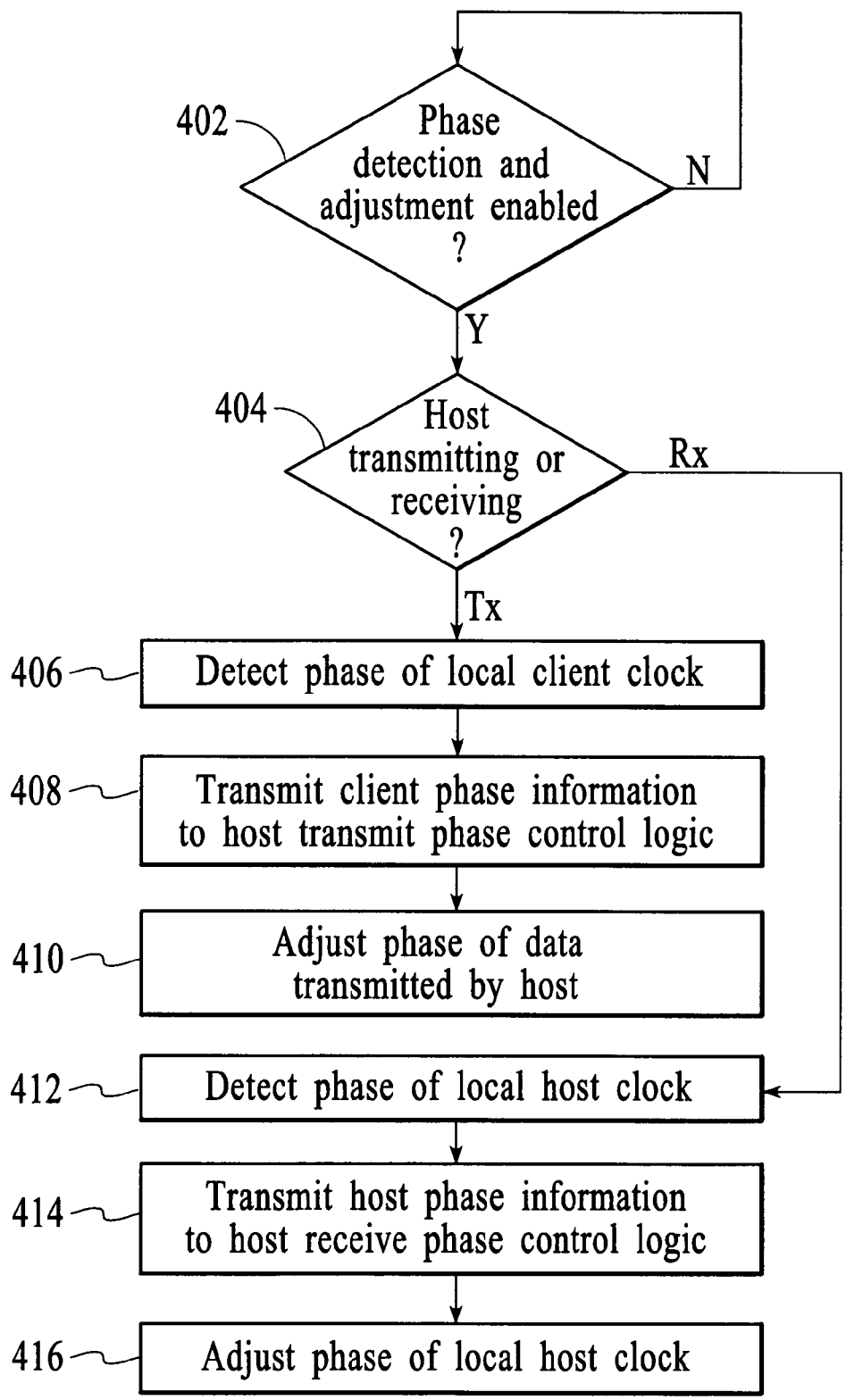
FIG. 4 is a flow diagram of a method performed by the IO system, according to an embodiment.

FIG. 4 is a flow diagram of a method 400 performed by the system as described above when the phase detection and adjustment is dictated by the governing protocol according to an embodiment.

At 402, it is determined whether phase detection and adjustment is enabled. If phase detection and adjustment is enabled, it is determined whether the host is transmitting or receiving at 404. If the host is transmitting, the phase of the local client clock is detected at 406. The client phase information is transmitted to the transmit phase control logic at 408. Because the host is transmitting, the output of the transmit phase control logic is input to the shared phase interpolator, and the phase of the data being transmitted to the client is adjusted by the shared phase interpolator at 410.

If the host is receiving, the phase of the local host clock is detected at 412. The host phase information is transmitted to the receive phase control logic at 414. Because the host is receiving, the output of the receive phase control logic is input to the shared phase interpolator, and the phase of the local clock output by the host PLL is adjusted by the shared phase interpolator at 416.

Other methods can also be performed by the embodiments of FIGS. 2 and 3. For example, in other embodiments, the phase detection and adjustment circuitry is always active and the select input of the multiplexer 322 determines the function of the circuitry.

In one embodiment, each of the data lines in data link 350 of FIG. 3 transmits client phase information, as well as data, between the host device and the client device. Transmitting the client phase information on the data lines themselves eliminates the need to provide dedicated pins for each data line or additional timing control lines in the data link. It also takes advantage of the inherent idle period between transmit and receive cycles to wait for the interface to be undriven (electrically idle) on a bidirectional link. Depending upon the actual host-client devices, and bus interface type, the idle period can vary. For example, in many current DRAM circuits, the transaction size (idle period) is several bits long, while for a proposed next generation DRAM, the transaction size is eight bits per burst (8 bits per wire).

In one embodiment, the client phase information is transmitted between the host and client during the electrical turnaround time between read and write operations. When the bus transaction is changed from a read to a write, the client phase information stored during the last write cycle is transmitted. The host receives the data and uses it to adjust the phase of the clock relative to the data to be transmitted.

Figure 5:
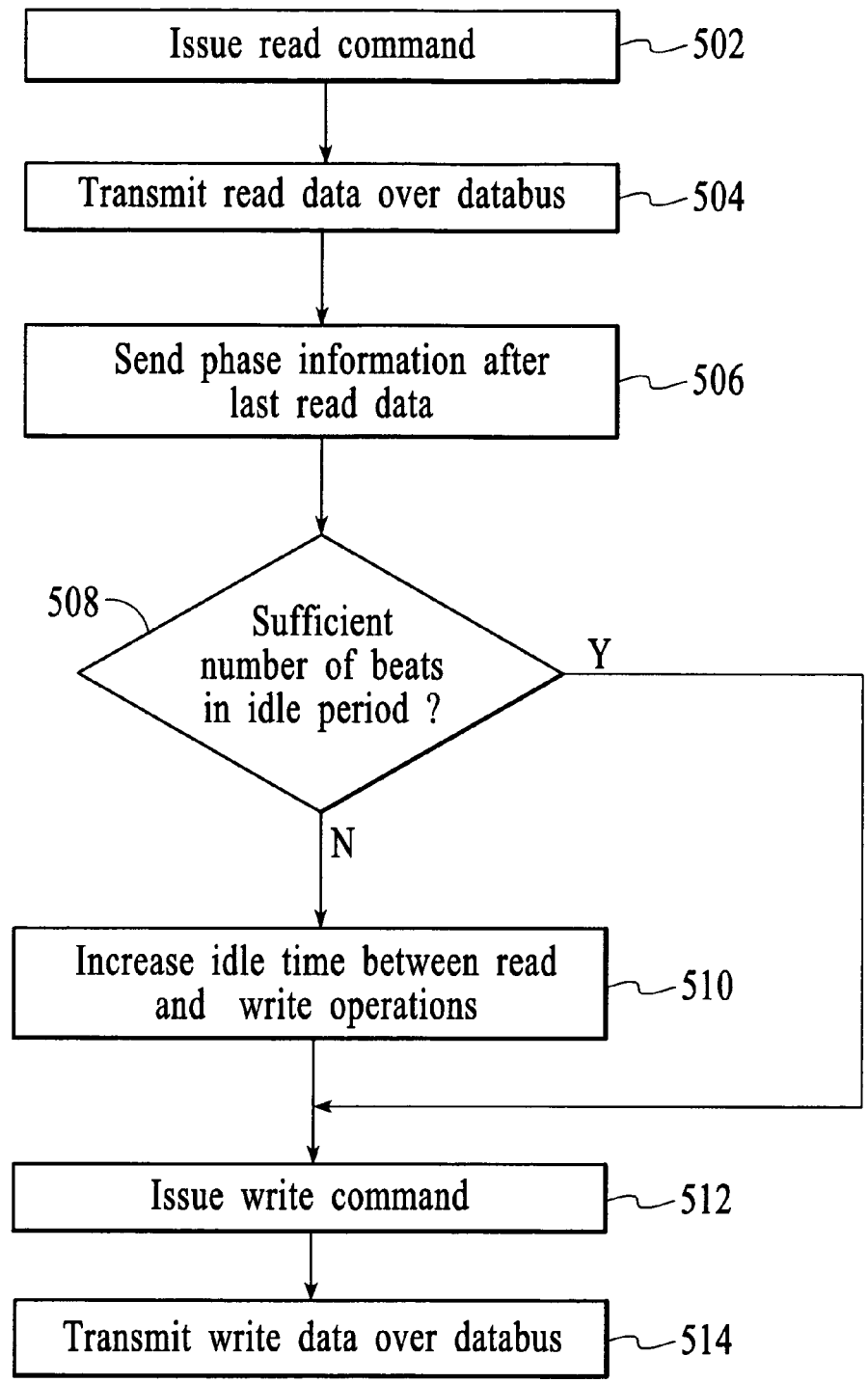
FIG. 5 is a flowchart that illustrates a method of communicating phase information to in an asymmetrical IO system, according to an embodiment.

FIG. 5 is a flowchart that illustrates a method of communicating client phase information to a host in an asymmetrical interface, according to an embodiment. In general, for a DRAM system, a read burst is initiated with a read command. A write command can be issued any time after a read command as long as the bus (electrical) turnaround time is met. For the embodiment illustrated in FIG. 5, a read command is first issued at 502. The read data is then transmitted over the data bus at 504. After the last read data is transmitted over the data bus, client phase information is transmitted over the data bus at 506. In one embodiment, the client phase information is transmitted on the first two bits after the last read data. However, it should be noted that the client phase information can be encoded as any number of bits within the electrical turnaround time of the bus. In certain cases, the electrical turnaround time may be too short to enable transmission of the encoded client phase information. Thus, at 508 it is determined whether there is a sufficient number of clock cycles in the electrical turnaround (idle) time of the bus. If there is insufficient turnaround time for transmission of the client phase information, the turnaround time is increased at 510 by either adding clock cycles or waiting for an additional read/write period until a sufficient number of clock cycles is provided for the client phase information, prior to the data write operation. If, in 508 it is determined that there is enough turnaround time for the transmission of the client phase information, the process proceeds directly with the issuance of a write command at 512 and the transmission of the write data over the data bus at 514.

Figure 6:
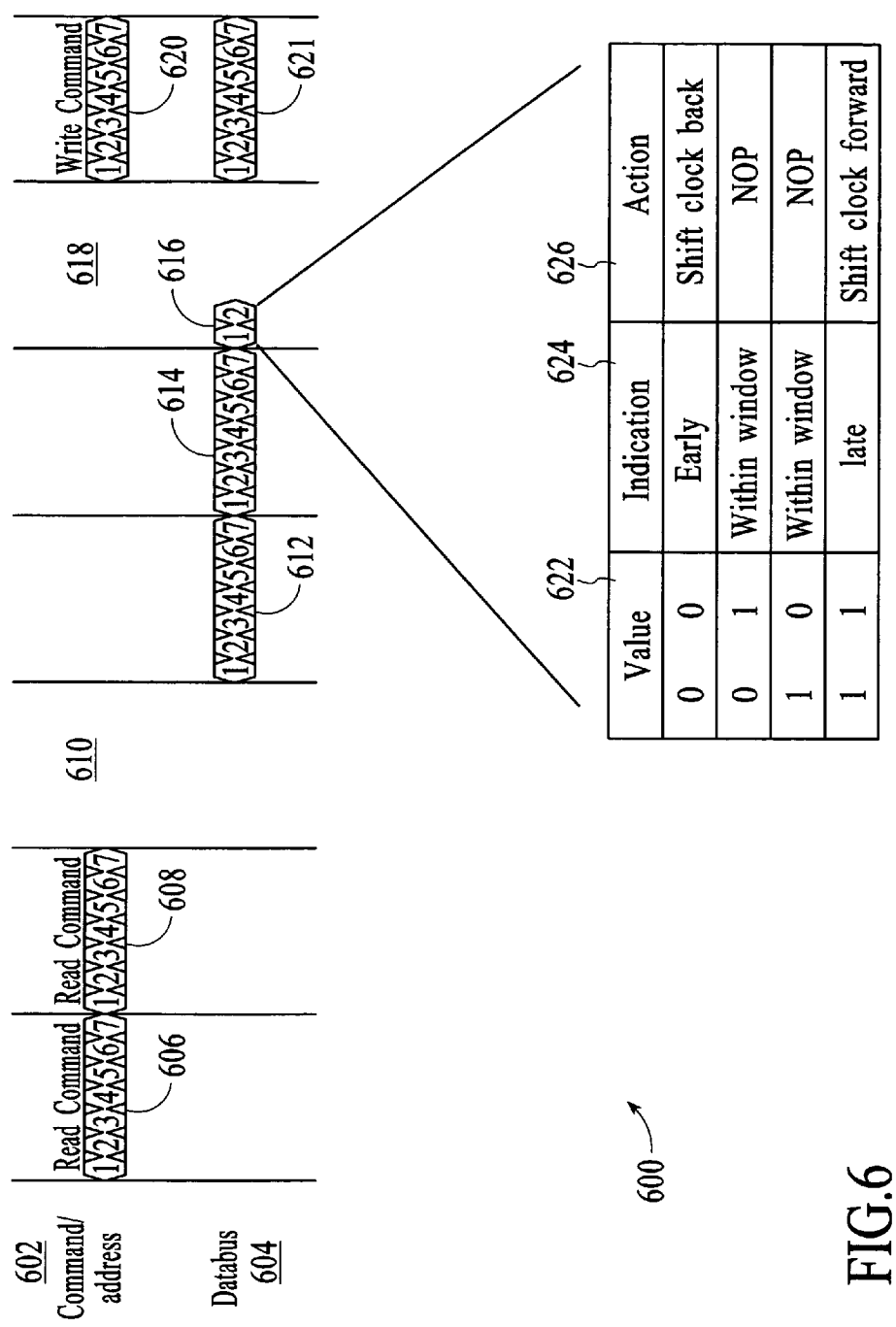
FIG. 6 is a timing diagram that illustrates the communication of client phase information to a host device in an asymmetrical IO system, according to an embodiment.

FIG. 6 is a timing diagram that illustrates the communication of client phase information to a host device in an asymmetrical interface, according to an embodiment. The timing diagram of FIG. 6 illustrates an example in which the idle period between transmit and receive cycles is eight bits per burst (8 bits per wire). In various embodiments, the idle period can include any number of cycles, including full cycles and portions of cycles, such as half clock cycles. The timing diagram 600 illustrates the command and data signals transmitted over a command/address bus 602 and a data bus 604 connected between a host device and a client device. As shown in FIG. 6, a first and second read command 606 and 608, each comprising 8-bits, is transmitted over command/address bus 602. Following idle period 610, two data words 612 and 614 to be read from the client device (e.g., DRAM) are transmitted over the data bus 604. This read operation is followed by a write operation, in which a write command 620 is transmitted over the command/address bus 602, resulting in the writing of data 621 to the client device. An idle period 618 for the electrical turnaround time of the data bus is between the transmission of the last read data 614 and the commencement of the write operation 620. For the example illustrated in FIG. 6, this turnaround time is assumed to be 8 bits long, however this time period may be different depending upon the characteristics of the devices and the bus interface between the devices.

In one embodiment, the client phase information bits, such as bits 616, are generated and encoded onto the data lines by an early/late detect circuit (e.g., circuit 308 in FIG. 3) on the client device, and decoded by a decoder circuit within the transmit phase control logic (e.g., circuit 324 in FIG. 3) on the host device. The decoded client phase information is then provided as an input to a phase interpolator on the host device to align the data transmitted from the host to the client relative to the client local clock. As stated above, in one embodiment, encoded client phase information 616 is transmitted from the client to the host device during the electrical turnaround time of the bus. The client phase information is transmitted as a series of bits (e.g., two or three bits) that indicate the phase of the client local clock relative to the data.

FIG. 6 includes a state table 620 that illustrates an example scheme for coding the client phase information bits, according to an embodiment. For the example illustrated in FIG. 6, two bits are used to encode the client phase information. In table 620, column 622 lists the possible value of the two bits that are used to encode the phase data, column 624 lists the client phase information associated with each of the four possible values of the two phase bits, and column 626 lists the action to be taken by the controller in response to the phase data. For the example illustrated in FIG. 6, a data value of "0 0" indicates that the clock signal is early relative to the data transmitted over the data bus. In this case, a phase interpolator on the host can be programmed to shift the clock signal back relative to the data, to synchronize the client local clock to the data. Likewise, a data value of "1 1" indicates that the clock signal is late relative to the data transmitted over the data bus. For this case, the phase interpolator on the host can be programmed to shift the clock signal forward relative to the data bus. For the case in which the bit values are "0 1" or "1 0" the indication is that the data is sufficiently within the window of the clock signal, so that no adjustment of the clock is required. In this case, a NOP (no operation), or equivalent action can be issued by the phase interpolator.

As illustrated in FIG. 6, two data bits can be used to encode the client phase information. It should be noted however, that depending upon the number of clock cycles present in the turnaround time provided for encoding the client phase information, a greater or lesser number of bits can be used to encode this information. A greater number of bits provides for more granularity in indicating precisely how misaligned or exact the clock signal is with regard to the data. For example, if three bits are used to encode the clock data, eight possible indications can be provided with respect to clock alignment.

This would allow the system to define whether the data is very late or very early, slightly late or slightly early, or exactly aligned, and adjust the clock accordingly.

For the embodiment illustrated in FIG. 6, the electrical turnaround time 618 is shown as a fixed number of clock cycles (e.g., 8 clock cycles). In an alternative embodiment, the electrical turnaround time between the read and write operations is dynamic and can be controlled, such as by software or logic circuitry, to vary over a particular range of clock cycles, such as from 2 clock cycles to 16 clock cycles. For this embodiment, the turnaround period can be programmed to conform specifically to the requirements of the encoded client phase information. Alternatively, if the electrical turnaround time is too short, a delay can be taken corresponding to at least one additional read/write cycle.

In one embodiment, the client phase information can be accumulated over a particular time period by filter circuit (e.g., a loop filter) to determine how to update the phase interpolator control value. The output of the filter can comprise a number of bits that encodes a summary of phase interpolator results accumulated since a prior transmission of client phase information to the host device.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list, and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for the system in which a memory controller is a host device and a DDR DRAM is a client device, as described by way of example above.

The various operations described may be performed in a very wide variety of architectures and distributed differently than described. For example, a single host device may communicate with, and perform clock phase adjustment for, multiple client devices in the manner described above. In addition, though many configurations are described herein, none are intended to be limiting or exclusive.

In other embodiments, some or all of the hardware and software capability described herein may exist in a printer, a camera, television, handheld device, mobile telephone or some other device. The elements and acts of the various embodiments described above can be combined to provide further embodiments. These and other changes can be made to the invention in light of the above detailed description.

In general, in the following claims, the terms used should not be construed to limit the method and system to the specific embodiments disclosed in the specification and the claims, but should be construed to include any methods and systems that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Accordingly, the inventors reserve the right to add additional claims after filing the application to pursue such additional claim forms for other aspects of the asymmetrical IO method and system.

What is claimed is:

1. A method comprising:
   detecting a phase of a clock signal in relation to a data signal transmitted between a host device and a client device over a bidirectional data link, the data link including one or more data lines configured to transmit the data signal;
   determining the time interval of a bus idle period between a read operation and a write operation between the host device and the client device;
   transmitting phase information corresponding to the phase, between the host and client device over the one or more data lines during the bus idle period; and
   increasing the time between read and write operations if the time interval is insufficient to allow transmission of the phase information.

2. The method of claim 1 wherein the phase information corresponds to a phase of a client clock signal of the client device in relation to data received from the host device.

3. The method of claim 1 wherein the client phase information comprises a predetermined number of bits, each bit of the predetermined number of bits occupying a number of cycles during the bus idle period, wherein a clock cycle comprises a half clock cycle.

4. The method of claim 3 further comprising the steps of:
   determining whether a sufficient number of clock cycles is present during the bus idle period to accommodate the predetermined number of bits; and
   altering the bus idle period to accommodate the predetermined number of bits if the bus idle period is insufficient.

5. The method of claim 1 further comprising:
encoding the client phase information in a client phase detection circuit, and decoding the client phase information in a phase control logic circuit on the host device.

6. The method of claim 5 wherein the phase control logic circuit generates a transmit phase control signal that is transmitted to a phase interpolator on the host device, and wherein the phase interpolator is configured to adjust a host clock signal used to transmit data to the client device.

7. The method of claim 1 wherein the client phase information characterizes the relative phase between the client clock signal and data signal received from the host device as one of late, early, and aligned, and wherein an aligned clock signal corresponds to a clock signal that is close to the center of a data eye of the data received from the host device.

8. The method of claim 7 wherein the client phase information comprises two bits transmitted during the bus turn-around time.

9. A method comprising:
encoding client phase information indicating bit skew between a clock signal and a data signal transmitted between a host device and a client device, the data signal transmitted over a bidirectional data line coupling the host device and the client device;
determining the time interval of a bus idle period between a read operation and a write operation between the host device and the client device;
transmitting the client phase information from the client device to the host device over the bidirectional data line during the bus idle period; and
increasing the time between read and write operations if the time interval is insufficient to allow transmission of the phase information.

10. The method of claim 9 wherein the client phase information comprises a predetermined number of bits, each bit of the predetermined number of bits occupying a number of clock cycles during the bus idle period, wherein a clock cycle comprises a half clock cycle.

11. The method of claim 10 wherein the client phase information comprises a plurality of bits transmitted during the bus idle period.

12. The method of claim 9 further comprising the steps of:
encoding the client phase information in a client phase detection circuit on the client device;
decoding the client phase information in a receive phase control logic on the host device.

13. The method of claim 12 further comprising the steps of:
transmitting the client phase information to a phase interpolator on the host device; and
adjusting a host clock signal used to transmit data to the client device in response to the client phase information.

14. The method of claim 9 further comprising accumulating client phase information over a pre-determined time period prior to transmitting the client phase information from the client device to the host device.

15. A system comprising:
a host device;
a client device coupled to the host device over a databus including one or more data lines configured to transmit a data signal between the host device and the client device;
a circuit to determine the time interval of a bus idle period between a read operation and a write operation between the host device and the client device; and
a phase detection circuit resident on the client device and configured to detect misalignment of a clock signal relative to a data signal transmitted to the client device from the host device over the one or more data lines, and further configured to transmit client phase information corresponding to the misalignment of the clock signal over the one or more data lines during the bus idle period, and to increase the time between read and write operations if the time interval is insufficient to allows transmission of the phase information.

16. The system of claim 15 further comprising:
an encoder circuit coupled to the phase detection circuit and configured to encode the client phase information transmitted to the host device during the bus idle period;
a decoder circuit resident on the host device and configured to decode the client phase information transmitted from the client device; and
a phase interpolator circuit coupled to the decoder circuit and configured to shift the clock signal relative to the data signal in response to the client phase information.

17. The system of claim 15 wherein the phase interpolator is a shared interpolator for both the receive circuit and transmit circuit of the host device.

* * * * *